3,784,524
URETHANE/THIOETHER-CONTAINING POLYENE COMPOSITION AND THE REACTION PRODUCT THEREOF
Charles R. Morgan, Silver Spring, Md., assignor to W. R. Grace & Co., New York, N.Y.
No Drawing. Filed June 25, 1971, Ser. No. 156,921
Int. Cl. C08g 22/04
U.S. Cl. 260—77.5 CR          4 Claims

ABSTRACT OF THE DISCLOSURE

A urethane/thioether-containing polyene composition is prepared and is cured in the presence of a free radical generator, such as ultraviolet irradiation, and a polythiol, forms odorless, solid, elastomeric products. The cured products may be used as sealants, coatings, adhesives, silverless photographic materials, printing plates, and molded articles.

BACKGROUND OF THE INVENTION

This invention relates to novel hydroxy terminated thioether containing alkenes, a method for their preparation and the utilization of these intermediates in the preparation of highly reactive polyenes. More particularly this invention relates to hydroxy terminated thioether containing alkenes having one or more reactive unsaturated carbon-to-carbon terminal end groups, such as allyl or vinyl ether groups and to curable polyenes formed from these alkenes.

These alkenes are formed of a molecule containing at least one hydroxy group and at least one unsaturated carbon-to-carbon bond disposed at terminal positions on a thioether containing main chain backbone of the molecule. Similarly, curable polyene compositions prepared from these hydroxy terminated thioether alkenes are formed of a molecule containing at least two unsaturated carbon-to-carbon bonds disposed at terminal positions on a thioether containing main chain backbone of the molecule, said backbone of the molecule being a polyvalent organic member free of reactive carbon-to-carbon unsaturation and free of highly water sensitive members. These novel curable polyenes have a molecular weight in the range of 200 to 20,000 and range from liquid to solid materials.

It is well known in the art that cure of internally unsaturated polymers such as polybutadiene or polyisoprene may be effected with polythiols. However, such polymers, due mainly to residual internal unsaturation after curing, are unstable either to thermal oxidation or ultra-violet catalyzed oxidation, and are subject to rapid attack by ozone. Eventually degradation and embrittlement results in the internal double bond polymers, substantially reducing their useful service life.

A limitation of commercially available liquid polyurethane prepolymers is the fact that they are terminated by isocyanate (—NCO) groups. These —NCO groups are extremely unstable in storage, and are highly water-sensitive such that under practical conditions, they react with traces of moisture from the atmosphere to form gaseous carbon dioxide and amino groupings which in turn react with more —NCO to form eventually a highly viscous, sometimes completely insoluble urea-extended chain network. In cases where insolubilization occurs, the polymer has to be discarded at great expense. Further, if the —NCO-terminated prepolymers come in contact with traces of either acidic or basic impurities, dimerization and/or trimerization of the —NCO functions may take place to form viscous, sometimes insoluble products during storage. Even mild alkalis such as those constituents normally present on the surface of glass vessels and containers may cause storage problems.

In accordance with this invention, numerous defects of the prior art may be effectively overcome by practice of the present invention which provides novel hydroxy terminated thioether alkenes which serve as intermediates in the preparation of novel polyenes which are curable by polythiols to solid polythioether resins or elastomers. When the polyenes of the present invention are compounded with polythiols, the prepared system may be stored safely for long periods of time in the absence of a free radical generator. Upon exposure to a free radical generator such as actinic light, the prepared system may be cured rapidly and controllably to a polythioether product which is low in cost and equal or better in reaction rate in polymer formation when compared with prior art compositions.

In accordance with this invention, reactive hydroxy terminated thioether alkenes which are difficult to prepare by conventional means can be prepared easily by the free radical addition of thioalcohols to compounds having terminal carbon-to-carbon unsaturated bonds. The hydroxy functionality of the resulting molecules can be utilized in the preparation of polyenes which possess highly reactive unsaturated end groups. As a result of the present invention, thioether containing polyenes having polymeric backbones which contain urethane, ether, ester, hydrocarbon, etc. linkages can be readily prepared. In turn, these polyenes which are solvent soluble and in particular, water soluble, can be photocured rapidly by polythiols in the presence of a UV sensitizer to insoluble materials.

Generally speaking, the hydroxy terminated thioether alkanes of the instant invention, having a molecular weight in the range of 160 to 20,000, have the general formula:

$$HO-R_1-S-CH_2-CH_2-(CH_2)_d-B_z-R-A_y$$

wherein $d$ is an integer from 0 to 12, $z$ is an integer from 0 to 1, $y$ is at least 1; A is a member selected from the group consisting of (a)            $-O-(CH_2)_d-CH=CH_2$
(b)            $-S-(CH_2)_d-CH=CH_2$
(c)            $-(CH_2)_d-CH=CH_2$ and B is a member selected from the group consisting of an oxygen atom, and a sulfur atom; R and $R_1$ are polyvalent organic members free from reactive carbon-to-carbon unsaturation; $R_1$ may be a polyvalent radical member selected from the group consisting of aryl, substituted aryl, alkaryl, substituted alkaryl, cycloalkyl, substituted cycloalkyl and alkyl having 1 to 16 carbon atoms.

Preferred example of operable aryl members are either phenyl or naphthyl, and of operable cycloalkyl members which have from 3 to 8 carbon atoms. Likewise, preferred substituents on the substituted members may be such groups as nitro, chloro, fluoro, acetoxy, acetamido, phenyl, benzyl, alkyl and alkoxy of 1 to 9 carbon atoms, and cycloalkyl of 3 to 8 carbon atoms.

The radical R member is selected from the same group as those of $R_1$, however in addition the R group members may be internally connected to one another by a linkage selected from the group consisting of oxide and hydrocarbon. Operable but non-limiting examples of groups having oxide linkages are repeating units such as $$-(C_2H_4O)_f-, -(C_3H_6O)_f-, -(C_4H_8-O-)_f,$$

wherein $f$ is an integer of at least 1.

As used herein the term polyvalent means having a valence of two or greater. The term alkene refers to a compound having at least one terminal reactive carbon-to-carbon unsaturated functional group per molecule. For example, allyl alcohol is considered a hydroxy alkene having one reactive carbon-to-carbon double bond per average molecule while 1,3-butadiene is an alkene having two reactive carbon-to-carbon double bonds. The term polyene refers to single or complex species of alkenes having a multiplicity of terminal reactive carbon-to-carbon unsaturated functional groups per average molecule. For example, a tetraene is a polyene that has four reactive carbon-to-carbon double bonds per average molecule.

In defining the position of the reactive functional carbon-to-carbon unsaturation, the term terminal is intended to mean that functional unsaturation is at an end of the main chain in the molecule; whereas by near terminal is intended to mean that the functional unsaturation is not more than 10 carbon atoms and typically less than 8 carbon atoms from an end of the main chain in the molecule. The term pendant means that the reactive carbon-to-carbon unsaturation is located terminal in a branch of the main chain as contrasted to a position at or near the ends of the main chain. For purposes of brevity all of these positions are referred to herein generally as terminal unsaturation.

Functionality as used herein refers to the average number of ene or thiol groups per molecule in the polyene or polythiol, respectively. For example, a triene is a polyene with an average of three reactive carbon-to-carbon unsaturated groups per molecule and thus has a functionality ($f$) of three. A dithiol is a polythiol with an average of two thiol groups per molecule and thus has a functionality ($f$) of two.

It is to be understood that the functionality of the polyene and the polythiol component is commonly expressed in whole numbers although in practice the average functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100% of the theoretical value for complete reaction, the functionality (assuming 100% pure starting materials) would be 2.0. If however, the reaction were carried to only 90% of theory for complete reaction, about 10% of the molecules present would have only one ene functional group, and there may be a trace of material that would have no ene functional groups at all. Approximately 90% of the molecules, however, would have the desired diene structure and the product as a whole then would have an actual functionality of 1.9. Such a product is useful in the instant invention and is referred to herein as having a functionality of 2.

The term reactive unsaturated carbon-to-carbon groups means groups which will react under proper conditions as set forth herein with thiol groups to yield the thioether linkage

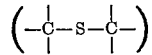

as contrasted to the term unreactive carbon-to-carbon unsaturation which means

groups found in aromatic nuclei (cyclic structures exemplified by benzene, pyridine, anthracene, and the like) which do not under the same conditions react with thiols to give thioether linkages.

The hydroxy terminated thioether alkenes are prepared by reacting, in the presence of a free radical generator, a thioalcohol of the general formula HO—$R_1$—SH and an alkene of the general formula

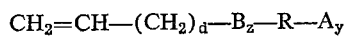

wherein $R_1$ and R are polyvalent organic members free from reactive carbon-to-carbon unsaturation and A is a member selected from the group consisting of (a) —O—$(CH_2)_d$—CH=$CH_2$
(b) —S—$(CH_2)_d$—CH=$CH_2$
(c) —$(CH_2)_d$—CH=$CH_2$ where $d$ is an integer from 0 to 12 and preferably 0 or 1 and $y$ is at least 1. More specifically, $B_z$, R and $R_1$ members are selected from the group previously defined in the thioethers of the subject invention having the formula:

$$HO—R_1—S—CH_2CH_2(CH_2)—B_z—R—A_y$$

Operable thioalcohols include but are not limited to 2-mercaptoethanol, 2-mercaptopropanol, 3-mercaptopropanol, 4-mercaptobenzyl alcohol, etc.

Operable alkenes are various dienes, trienes, etc. which include but are not limited to 1,5-hexadiene, 1,7-octadiene, 1,11-dodecadiene, etc. Also operable alkenes are various vinyl and allyl thioethers.

The preferred alkenes are those having allyl or vinyl ether end groups which are usually commercially available or may be formed by known synthetic routes.

Operable alkenes include but are not limited are allyl ethers of polyhydric alcohols such as tri-methylolpropane tri-allyl ether, tri-methylolethane tri-allyl ether. Compounds such as 1,4-divinyloxybutone, diallyl formal, etc. are likewise operable. Additional alkenes useful within the scope of this invention are polyenes, disclosed in copending application Ser. No. 156,922, filed June 25, 1971 and assigned to the same assignee. These polyenes have the general formula

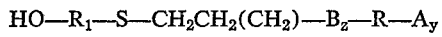

wherein $R_4$ is a polyvalent organic member containing no reactive carbon to carbon unsaturation and which may contain oxygen atoms in the chain, said member remaining after $x$ —O—$(CH_2)_d$—$CH_2CH_2OH$ groups of a polyhydric alcohol have been converted to —O—$(CH_2)_d$—CH=$CH_2$ groups, and $d$ is an integer from 0 to 12 preferably 0 or 1, $x$ is at least 2.

Polyhydric alcohols, which are suitable for the preparation of polyethers of the above described formula are polyhydroxy compounds such as glycols, triols, tetraols, pentaols, hexaols, and the like, and having a molecular weight of at least 62.

Preferred polyhydroxy compounds are glycols formed from poly (alkylene oxides) such as polyethylene glycols, polypropylene glycols, polybutylene glycols or mixed poly(alkylene oxide) glycols. Preferably, the molecular weight of these polyols is within the range of 200 to 25,000 and especially within the range of 400 to 6000.

Other suitable polyhydric alcohols are those formed by addition of an alkylene oxide, especially ethylene or propylene oxide to a triol or higher polyol. A specific example of a preferred polyol is an ethoxylated pentaerythritol.

The above described polyenes having polyalkylene oxide moieties incorporated therein are solvent soluble and generally water soluble, e.g., polyethylene glycols having —$(C_2H_4O)_f$-groups wherein $f$ is at least 8 and are water soluble.

One operable method of preparing polyethers having the above formula

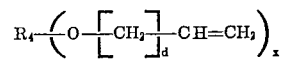

is by the dehydrohalogenation of the bromide of a polyol, such as poly(ethylene ether) glycol with a strong base in the presence of a suitable solvent. Operable strong bases and solvents include but are not limited to sodium or potassium alcoholates and the solvent being the alcohol from which the base is derived. The reaction is conducted at the reflux temperature of the alcohol. Preferably the reaction is carried out with potassium t-butoxide as the base at the reflux temperature of t-butyl alcohol solvent. The resultant polyenes are vinyl ethers having polyalkylene oxide e.g., polyethylene oxide backbones incorporated within the chain of the molecule.

The bromide of the desired polyol e.g., dibromide of poly(ethylene ether) glycol is prepared by reacting the corresponding tosylate of the polyol with an excess of sodium bromide in the presence of a suitable solvent such as dimethyl sulfoxide at a temperature in the range from about 25° C. to 189° C., preferably from about 25° C. to 100° C.

The required tosylate e.g., poly(ethylene ether) ditosylate is prepared by reacting the polyol with p-toluenesulfonyl chloride in the presence of a base which removes the liberated hydrogen chloride. Inert solvents may be used or the base may serve as the solvent. An operable example is the use of pyridine both as the base and solvent at temperatures from about 0° C. to 50° C.

The addition of the thioalcohol to the aforementioned alkene is carried out at a temperature in the range from 0 to about 100° C., preferably from 25 to about 80° C., for a period of about 5 minutes to about 24 hours, preferably from 0.5 to about 5 hours. The process may be carried out in the presence of inert solvents.

The addition of the thioalcohol to the alkene reaction may be initiated by any free radical mechanism which dissociates or abstracts a hydrogen atom from an SH group, or accomplishes the equivalent thereof. Thus, it is possible merely to expose the polyene and thioalcohol admixture to ambient conditions (oxygen from the air is the initiator) and obtain a polythioether addition product. Radiation, such as ultraviolt light (with or without curing rate accelerators such as chemical photoinitiators, or sensitizers such as benzophenone, acetophenone, acenapthenequinone, methyl ethyl ketone, valero-phenone, hexanophenone, γ-phenylbutyrophenone, p-morpholinopropiophenone, dibenzosuberone, 4-morpholinobenzophenone, 4'-morpholinodeoxybenzoin, p-diacetylbenzene, 4-aminobenzophenone, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1, 3,5-triacetylbenzene, thioxanthen-9-one, xanthene-9-one, 7-H-benz[de]anthracen-7-one, 1-naphthaldehyde, 4,4'-bis (dimethylamino)benzophenone, fluorene-9-one, 1'-acetonaphthone, 2'-acetonaphthone and 2,3-butanedione, etc. Additionally, azo compounds or peroxides (with or without amine accelerators) which decompose at ambient conditions are also operable as free radical generating agents capable of promoting the addition reaction. The reaction will likewise proceed by merely heating the reactants. Photochemical generation of free radicals is preferred.

Useful inert solvents include saturated aliphatic hydrocarbons, aliphatic ethers, aliphatic thioethers and mixtures thereof. Representative nonlimiting examples of such solvents include pentane, cyclohexane, dimethyl sulfide, diethyl sulfide, glyme etc.

The thioalcohol is added in such stoichiometric proportions that each thiol group reacts with only one of the terminal reactive carbon to carbon unsaturated functional groups of each alkene molecule.

The resultant products, hydroxy-terminated thioether alkenes, have many uses as intermediates because of the presence of the hydroxy and reactive carbon-to-carbon unsaturated terminal functional groups. The presence of the thioether group within the molecule makes it a useful intermediate in the formation of compounds having biological activity. The hydroxy group may be reacted with mono or polycarboxylic acids to give reactive terminally unsaturated esters and polyesters having thioether linkages.

More particularly, the hydroxy-terminated thioether alkenes are utilized in the formation of curable urethane/thioether containing polyenes having the general formula:

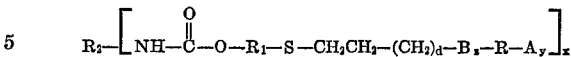

wherein $x$ is at least 2, Y is at least 1, $z$ is an integer from 0 to 1, $d$ is an integer from 0 to 12; A is a member selected from the group consisting of

and $-(CH_2)_d-CH-CH_2$; B is a member selected from the group consisting of an oxygen atom or sulfur atom and R, $R_1$ and $R_2$ are polyvalent organic members free from carbon to carbon unsaturation. Preferably R and $R_1$ are selected from group members previously defined for the intermediates of the instant invention the hydroxy terminated thioether alkenes. Preferably $R_2$ is a polyvalent radical member selected from the group consisting of aryl, substituted aryl, aralkyl, substituted aralkyl, cycloalkyl, substituted cycloalkyl and alkyl and substituted alkyl groups containing 1 to 36 carbon atoms, said group members can be internally connected to one another by a linkage selected from the group consisting of oxide, carboxylate, carbonate, urethane and substituted urethane, urea and substituted urea, amide and substituted amide, amine and substituted amine and hydrocarbon.

A general method of forming one type of polyene containing urethane/thioether groups is to react a polyol of the general formula $R_{11}-(OH)_n$ wherein $R_{11}$ is a polyvalent organic moiety free from reactive carbon-to-carbon unsaturation an $n$ is at least 2; with a polyisocyanate of the general formula $R_{12}-(NCO)_n$ wherein $R_{12}$ is a polyvalent organic moiety free from reactive carbon-to-carbon unsaturation and $n$ is at least 2 and hydroxy terminated thioether alkene of the previously defined formula $HO-R$, $-S-CH_2CH_2(CH_2)_d-B_z-R-A_y$. The reaction is carried out in a moisture-free atmosphere at atmospheric pressure at a temperature in the range from 0 to about 120° C. for a period of about 5 minutes to about 48 hours. The reaction is preferably a one step reaction wherein all the reactants are charged together. The hydroxy terminated thioether alkene and said polyol are added in combination in a stoichiometric amount necessary to react with the isocyanate groups in the polyisocyanate. The reaction may if desired be carried out in the presence of a catalyst. Thin catalysts such as dibutyl tin dilaurate, stannous octoate and tertiary amines such as triethylene diamine are operable.

In summary, by admixing the novel urethane/thioether polyenes disclosed herein containing two or more reactive unsaturated carbon-to-carbon bonds located terminal from the main chain with a polythiol containing two or more thiol groups per molecule and thereafter exposing said mixture to free-radical generators, there is provided an essentially odorless solid elastomeric or resinous polymeric product.

Polythiols used herein for curing to a 3 dimensional network are simple or complex organic compounds having a multiplicity of pendant or terminally positioned —SH functional groups per average molecule.

On the average the polythiol used for curing must contain 2 or more —SH groups/molecule and have a viscosity range of essentially 0 to 20 million centipoises (cps.) at 25° C. as measured by a Brookfield Viscometer. Operable polythiols used for curing in the instant invention usually have molecular weights in the range about 94 to about 20,000, and preferably from about 100 to about 10,000.

The polythiols used for curing in the instant invention may be exemplified by the general formula $R_8(SH)_n$ where $n$ is at least 2 and $R_8$ is a polyvalent organic moiety free from reactive carbon-to-carbon unsaturation. Thus $R_8$ may contain cyclic groupings and minor amounts of hetero atoms such as N, P or O but primarily contains carbon-carbon, carbon-hydrogen, carbon-oxygen, or silicon-oxygen containing chain linkages free of any reactive carbon-to-carbon unsaturation.

One class of polythiols operable with polyenes to obtain essentially odorless polythioether products are esters of thiol-containing acids of the formula HS—$R_9$—COOH where $R_9$ is an organic moiety containing no reactive carbon-to-carbon unsaturation with polyhydroxy compounds of structure $R_{10}(OH)_n$ where $R_{10}$ is an organic moiety containing no reactive carbon-to-carbon unsaturation, and $n$ is 2 or greater. These components will react under suitable conditions to give a polythiol having the general structure:

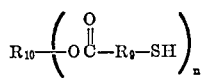

where $R_9$ and $R_{10}$ are organic moieties containing no reactive carbon-to-carbon unsaturation, and $n$ is 2 or greater.

Certain polythiols such as the aliphatic monomeric polythiols (ethane dithiol, hexamethylene dithiol, decamethylene dithiol, tolylene-2,4-dithiol, and the like, and some polymeric polythiols such as a thiol-terminated ethylcyclohexyl dimercaptan polymer, and the like, and similar polythiols which are conveniently and ordinarily synthesized on a commercial basis, although having obnoxious odors, are operable but many of the end products are not widely accepted from a practical, commercial point of view. Examples of the polythiol compounds preferred because of relatively low odor level include but are not limited to esters of thioglycolic acid

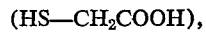

α-mercaptopropionic acid (HS—CH(CH₃)—COOH) and β-mercaptopropionic acid (HS—CH₂CH₂COCH) with polyhydroxy compounds such as glycols, triols, tetraols, pentaols, hexaols, and the like. Specific examples of the preferred polythiols include but are not limited to ethylene glycol bis (thioglycolate), ethylene glycol bis (β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis (β-mercaptopropionate) which is prepared from polypropylene-ether glycol (e.g. Pluracol P2010, Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and practically useful resins or elastomers for both indoor and outdoor applications.

Prior to curing, the curable liquid polymer may be formulated for use as 100% solids, or disposed in organic solvents, or as dispersions or emulsions in aqueous media.

To obtain the maximum strength, solvent resistance, creep resistance, heat resistance and freedom from tackiness, the reaction components consisting of the polyenes and polythiols are formulated in such a manner as to give solid, crosslinked, three dimensional network polythioether polymer systems on curing. In order to achieve such infinite network formation the individual polyenes and polythiols must have a functionality of at least 2 and the sum of the functionalities of the polyene and polythiol components must always be greater than 4. Blends and mixtures of the polyenes and the polythiols containing said functionality are also operable herein.

The compositions to be cured may, if desired, include such additives as antioxidants, accelerators, dyes, inhibitors, activators, fillers, pigments, anti-static agents, flame-retardant agents, thickeners, thixotropic agents, surface-active agents, viscosity modifiers, extending oils, plasticizers, tackifiers and the like. Such additives are usually preblended with the polyene or polythiol prior to or during the compounding step. The additives may be present in quantities up to 500 parts or more per 100 parts polyene or polythiol by weight and preferably from 0.005 to about 300 parts on the same basis.

The curable polymer compositions prior to curing may readily be pumped, poured, siphoned, brushed, sprayed, doctored, or otherwise handled as desired. In instances where the polyene is a solid at room temperature, heat may be applied to put the material in a fluid state. Following application, curing in place to a solid cured resin or elastomer may be effected either very rapidly or extremely slowly as desired by manipulation of the compounding ingredients and the method of curing.

The polythioether-forming components and compositions, prior to curing, may be admixed with or blended with other monomeric and polymeric materials such as thermoplastic resins, elastomers or thermosetting resin monomeric or polymeric compositions. The resulting blend may be subjected to conditions for curing or co-curing of the various components of the blend to give cured products having unusual physical properties.

The curing reaction may be initiated by any free radical mechanism which dissociates or abstracts a hydrogen atom from an SH group, or accomplishes the equivalent thereof. The various sources of operable free radical generators which will yield the desired cured solid elastomeric or resinous product are those previously disclosed as being operable in the preparation of hydroxy terminated thioether alkenes of the subject invention whereby the thioalcohols were added to the alkene starting materials.

It is also possible, if desired, to use various forms of high energy irradiation for curing. Peroxides and hydroperoxides, whether or not accelerated, presently used in the curing of unsaturated polyesters are operable as free radical generators to initiate curing. Examples of some operable peroxides and accelerators include but are not limited to, benzoyl peroxide with dimethylaniline as an accelerator, cumene hydroperoxide with cobalt naphthenate as an accelerator and cyclohexanone peroxide with either of the aforementioned accelerators. The peroxides and hydroperoxides may also be generated in situ if so desired.

The curing period may be retarded or accelerated from less than 1 minute to 30 days or more. Conventional curing initiators or accelerators operable include, but are not limited to oxygen; peroxides, hydroperoxides, peracids; persulfates, azo compounds such as azobis-isovaleronitrile; ultraviolet light (with and without coagent sensitizers); high energy radiation such as X-rays, β-rays, electron beams, gamma radiation, and the like; ozone; oxidizing agents such as PbO₂; and cyclohexanone peroxide with dimethyl aniline. Conventional curing inhibitors or retarders include but are not limited to hydroquinone; p-tert-butyl catechol; 2,6-ditert-butyl-p-methylphenols; phenothiazine; N-phenyl-2-napthylamine.

The following examples are given to further illustrate the present invention. In all cases, unless otherwise noted, all parts and percentages are by weight.

FORMATION OF HYDROXY TERMINATED THIOETHER ALKENE INTERMEDIATES

Example 1

142.2 g. (1 mole) of commercially available 1,4-divinyl oxybutane was charged to a Vycor tube, maintained under nitrogen atmosphere and equipped with a condenser, thermometer, gas dispersion tube and a dropping funnel. The tube was located in the central cavity of a four tiered circular UV lamp (PCQ-XI photochemical lamp) having 89–90% irradiance at 253.7 nanometers. 79.1 g. (1 mole) of 2-mercaptoethanol was added slowly to the reaction vessel for a period of about 5 hours at a temperature maintained at about 30° C. End group analysis of the resulting thioether having a terminal hydroxy group showed unsaturation to be 93% of theory.

Example 2

15 g. of the ditosylate of poly(ethylene ether) glycol (prepared by reacting tosyl chloride with commercially available poly(ethylene ether) glycol having a molecular weight of 400 in the presence of pyridine), 45 g. of sodium bromide and 500 ml. of dimethyl sulfoxide were placed in a reaction vessel, mixed for 15 hours and thereafter allowed to stand for an additional 12 hours during which a precipitate formed. The resultant slurry was filtered and the solids were discarded. Thereafter, the dimethyl sulfoxide solvent was removed from the solution by vacuum stripping. The resultant solid was charged to a resin kettle equipped with a condenser, magnetic stirrer and thermometer, and 9.4 g. of potassium t-butoxide and 200 ml. t-butyl alcohol were added. The mixture was heated to reflux and allowed to react for 15 hours. The reaction mixture was filtered and the filtrate was stripped to remove the t-butyl alcohol solvent. The structure of the resultant water soluble divinyl ether was verified by N.M.R. analysis.

Example 3

Following the procedures of Example 1 and using the necessary amounts of reactants, one mole of the divinyl ether formed in Example 2 and one mole of 2-mercaptoethanol, a hydroxy terminated thioether alkene having polyethylene oxide backbones and a terminal vinyl ether group was formed.

Example 4

Following the procedures of Example 1 and using the necessary amounts of reactants: one mole of a divinyl ether prepared according to the procedures in Example 2 from a commercially available poly(tetramethylene ether) glycol having a molecular weight of 2000; and one mole of 4-mercaptobenzyl alcohol, a hydroxy terminated alkene having a terminal vinyl ether group was formed.

Example 5

Following the procedures of Example 1 and using the necessary amounts of reactants: one mole of trimethylolpropane triallylether (prepared by reacting the sodium salt of trimethylolpropane diallylether with allyl bromide using xylene as solvent) and 1 mole of 2-mercaptopropanol, an alkene of the following formula was prepared:

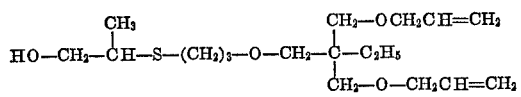

Example 6

Following the procedures of Example 1 and using the necessary amounts of reactants in one mole of 1,5-hexadiene and one mole of 3-mercaptopropanol, a vinyl terminated alkene of the following formula was prepared:

FORMATION OF POLYENE PREPOLYMER

Example 7

28.8 g. of the 1,4-divinyloxybutane-mercapto ethanol adduct formed in Example 1 was charged to a dry resin kettle maintained under an argon atmosphere and equipped with a condenser, stirrer, thermometer, and gas inlet and outlet. 12.2 g. of commercially available tolylene diisocyanate was charged to the kettle and the reaction was continued for about 48 hours with stirring at about 60° C. The resultant product was vinyl ether terminated urethane/thioether polyene.

Example 8

Following the procedures of Example 7 and using the necessary reactants: one mole of a commercially available liquid polymeric diisocyanate sold under the trade name "Adiprene L–100" by E. I. du Pont de Nemours & Co. and two moles of the hydroxy terminated thioether alkene formed in Example 1, an $CH_2=CH-O-$ terminated urethane/thioether polyene was prepared.

Example 9

Example 8 was repeated except that one mole of a commercially available polyesterdiisocyanate, made from ethylenepropylene glycol adipate and tolylene diisocyanate, and having a molecular weight of 2800 sold under the trade name of Solithane 291 by Thiokol Chemical Co. was added to 2 moles of the hydroxy terminated thioether alkene formed in Example 1 to form a $CH_2=CH-O-$ terminated urethane/thioether prepolymer having polyester backbones.

Example 10

Following the procedures of Example 1 and using the necessary amounts of reactants: one mole of hexamethylene diisocyanate and two moles of the ally ether group containing alkene prepared in Example 5, an allyl ether terminated urethane/thioether polyene was prepared.

Example 11

Following the procedures of Example 1 and using the necessary amounts of the reactants: one mole of commercially available poly(ethylene ether) glycol having a molecular weight of 1450 and two moles of commercially available 1,3-xylylene diisocyanate, 2.9 g. dibutyl tin dilaurate as catalyst and two moles of the hydroxy terminated thioether alkene formed in Example 6, a vinyl terminated urethane/thioether prepolymer having polyethylene oxide backbones was prepared.

CURING PROCESS

Example 12

3.08 g. of the $CH_2=CH-O-$ terminated urethane/thioether polyene formed in Example 7 was mixed in an aluminum cup with 1.22 g. of pentaerythritol tetrakis (β-mercaptoproprionate) commercially available from Carlisle Chemical Co. under the trade name "Q–43" and 0.046 g. of benzophenone. The mixture was irradiated under a sunlamp delivering 4000 microwatts/cm.$^2$ at the surface of the admixture to give a skin cure (i.e. curing of the surface) in about 2 seconds.

Example 13

2.15 g. of the allyl ether terminated polyene prepolymer prepared in Example 10 was mixed in an aluminum cup with 1.22 g. of "Q–43" and 0.032 g. of benzophenone. The mixture was irradiated under a sunlamp delivering 4000μ watts/cm.$^2$ to give a skin cure in about 3 seconds. A total exposure of about 15 minutes gave a through cure which resulted in a tack-free solid.

Example 14

Example 13 was repeated except that 0.032 g. of dibenzosuberone was used in place of benzophenone. The sample gave a skin cure in 1 second. A total exposure of 45 seconds gave a through cure which resulted in a tack-free solid.

Example 15

The following example illustrates the use of the photocured polyenes in the preparation of silverless photographic prints.

2.17 g. of prepolymer formed in Example 11 was admixed with 0.244 g. of "Q–43," 0.218 g. of benzophenone and 0.15 g. carbon black (Sterling FT) to form a photosensitive composition. This admixture was coated on a clear UV transparent polyethylene terephthalate i.e., "Mylar" film (5 mils thick) and cut into two 35 mm. length strips. A ⅛" thick glass was placed on top of one of the coated Mylar strips to form a sandwich. This sandwich was exposed under and in contact with a 35-mm. photographic silver halide negative to an Ascorlux lamp delivering 4000 microwatts/cm.² for 2 seconds. The sandwich was peeled apart leaving a latent image of cured polythioether polymer on the Mylar layer. The latent image was developed by washing the Mylar layer with ethanol at 50° C. for 15 seconds to remove the uncured polymer. The image containing Mylar sheet was then air dried for 1 minute, and then reexposed to the same Ascorlux lamp to further harden the image. A print with a permanent glossy image was produced.

The molecular weight of the polyenes of the present invention may be measured by various conventional methods including solution viscosity, osmotic pressure and gel permeation chromatography. Additionally, the molecular weight may be calculated from the known molecular weight of the reactants.

The viscosity of the polyenes and polythiols may be measured on a Brookfield Viscometer at 25° or 70° C. in accord with the instructions therefor.

The components to be cured may be prepared as either single-packaged or multi-packaged solid or liquid polymer systems which may be cured to solid polythioether elastomers without liberating gaseous by-products which cause bubbles and voids in the vulcanizate. Thus, there is provided curable solid or liquid polymer systems composed of polyenes and polythiols in which the components individually are storage stable and which are not sensitive to or deteriorated by traces of moisture or oxygen-containing gas such as may be encountered during normal storage or handling procedures. Solid resinous or elastomeric products may be prepared from solids or flowable liquids in a system in which the rate of curing may be inhibited or retarded by the use of chemical inhibitors, antioxidants, and the like. The cured product may be characterized as in the thermally and oxidatively stable state since there is no reactive carbon-to-carbon unsaturation in the main backbone chain.

Solid cured polythioether polymer products have many and varied uses, examples of which include but are not limited to adhesives; caulks; sealants; coatings; impregnants for porous substrates; filleting compounds; silverless photographic materials; printing plates; molded articles and the like.

Odorless has been used herein to mean the substantial absence of the well-known offensive and sometimes obnoxious odors that are characteristic of hydrogen sulfide and the derivative family of compounds known as mercaptans.

Highly water-sensitive groups are intended to include, for example, isocyanate, acyl halide such as acyl chloride, anhydride and the like which readily and rapidly react with water, alcohol, ammonia, amines and the like.

It is understood that the foregoing detailed description is given merely by way of illustration and that many variations may be made therein without departing from the spirit of this invention.

What is claimed is:

1. A urethane/thioether-containing polyene composition having a molecular weight in the range 200 to 20,000 of the general formula:

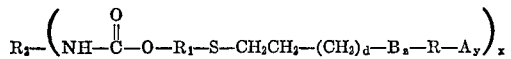

wherein $x$ is at least 2, $y$ is at least 1, $z$ is an integer from 0 to 1, $d$ is an integer from 0 to 12; A is a member selected from the group consisting of (a)         —O—$(CH_2)_d$—CH=$CH_2$ (b)         —S—$(CH_2)_d$—CH=$CH_2$ (c)         —$(CH_2)_d$—CH=$CH_2$ B is a member selected from the group consisting of an oxygen atom or sulfur atom; R and $R_2$ are free from reactive carbon to carbon unsaturation; and R is a polyvalent member selected from the group consisting of aryl, substituted aryl, alkaryl, substituted alkaryl, cycloalkyl, substituted cycloalkyl and alkyl having 1 to 16 carbon atoms radical and mixtures thereof, said group members can be internally connected to one another by an oxide linkage; and $R_2$ is a polyvalent member selected from the group consisting of aryl, substituted aryl, aralkyl, substituted aralkyl, cycloalkyl, substituted cycloalkyl and alkyl and substituted alkyl groups containing 1 to 36 carbon atoms radical and mixtures thereof; said group members can be internally connected to one another by at least one linkage selected from the group consisting of oxide, carboxylate, carbonate, urethane and substituted urethane, urea and substituted urea, amide and substituted amide, amine and substituted amine; and $R_1$ is a polyvalent radical member selected from the group consisting of aryl, substituted aryl, alkaryl, substituted alkaryl, cycloalkyl, substituted cycloalkyl and alkyl having 1 to 16 carbon atoms, and mixtures thereof.

2. A polyene composition of claim 1 wherein B is an oxygen atom, $z$ is 1 and A is an —O—$(CH_2)_d$CH=$CH_2$ group.

3. A polyene composition of claim 1 having the formula:

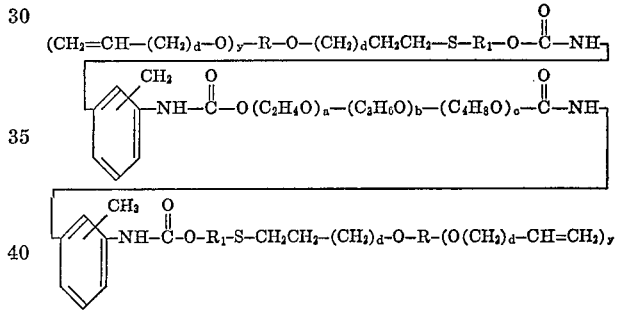

wherein the sum of $a+b+c$ is at least 1, $y$ is at least 1, $d$ is an integer from 0 to 12 and the radicals R and $R_1$ have the same meaning as in claim 1.

4. An essentially odorless, solid, self-supporting polythioether composition consisting essentially of a cured reaction product of:

(a) a urethane/thioether containing polyene composition having a molecular weight in the range 200 to 20,000 of the general formula:

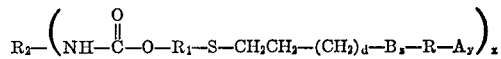

wherein $x$ is at least 2, $y$ is at least 1, $z$ is an integer from 0 to 1, $d$ is an integer from 0 to 12; A is a member selected from the group consisting of:

(1)         —O—$(CH_2)_d$—CH=$CH_2$ (2)         —S—$(CH_2)_d$—CH=$CH_2$ (3)         —$(CH_2)_d$—CH=$CH_2$

B is a member selected from the group consisting of an oxygen atom or sulfur atom; R and $R_2$ are free from reactive carbon to carbon unsaturation; and R is a polyvalent member selected from the group consisting of aryl, substituted aryl, alkaryl, substituted alkaryl, cycloalkyl, substituted cycloalkyl, and alkyl having 1 to 16 carbon atoms radical and mixtures thereof said group members can be internally connected to one another by an oxide linkage; and $R_2$ is a polyvalent member selected from the group consisting of aryl, substituted aryl, aralkyl, substituted aralkyl, cycloalkyl, substituted cycloalkyl and alkyl and substituted alkyl groups containing 1 to 36 carbon atoms radical and mixtures thereof; said group members can be internally connected to one another by at least one linkage selected from the group consisting of oxide, carboxylate, carbonate, urethane and substituted urethane, urea and substituted urea, amide and substituted amide, amine and substituted amine; and $R_1$ is a polyvalent radical member selected from the group consisting of aryl, substituted aryl, alkaryl, substituted alkaryl, cycloalkyl, substituted cycloalkyl and alkyl having 1 to 16 carbon atoms, and mixtures thereof;

(b) A polythiol and mixtures thereof having a molecular weight in the range 94–20,000 of the general formula: $R_8$—$(SH)_n$ where $R_8$ is a polyvalent organic moiety free from reactive carbon to carbon unsaturation and $n$ is at least 2, said cured reaction product having been cured under ambient conditions in the presence of a free radical generator.

References Cited

UNITED STATES PATENTS

| | | | |
|---|---|---|---|
| 3,661,744 | 5/1972 | Kehr et al. | 204—159.14 |
| 3,662,023 | 5/1972 | Kehr et al. | 260—858 |
| 2,780,567 | 2/1957 | Kine et al. | 260—609 R |
| 2,949,474 | 8/1960 | Murdoch et al. | 260—609 R |
| 3,686,326 | 8/1972 | Oswald et al. | 260—79 |
| 3,645,982 | 2/1972 | Larsen | 204—159.18 |

DONALD E. CZAJA, Primary Examiner

M. I. MARQUIS, Assistant Examiner

U.S. Cl. X.R.

204—159.18, 159.24; 260—77.5 MA, 77.5 AM, 79, 79.1, 79.5 B, 79.5 C, 609 A, 609 B